Patented Feb. 23, 1932

1,846,961

UNITED STATES PATENT OFFICE

HERALD B. GREENING, OF HAMILTON, ONTARIO, CANADA, AND JAMES W. GALLOWAY, OF DETROIT, MICHIGAN, ASSIGNORS TO GALLOWAY ENGINEERING COMPANY, LIMITED, OF HAMILTON, ONTARIO, CANADA

TORQUE AMPLIFIER

Application filed August 23, 1928. Serial No. 301,586.

The principal objects of this invention are to provide a mechanism by means of which power may be transmitted from a driving to a driven shaft at variable speeds always maintaining a driving connection between the driving and driven members and to enable such transmission being effected under variable torque.

A further object of the invention is to provide a mechanism in which the speed of the driven member will be automatically controlled in direct proportion to the torque thereby eliminating the necessity of manual controls.

A still further object is to provide a mechanism which may be operated effectively as a slip clutch with the capability of full disengagement.

The principal feature of the invention consists in utilizing the principles defined in our co-pending patent application No. 295,427, filed July 26, 1928, now Patent Number 1,787,246 granted December 30, 1930, in operating means for transmitting a variable torque to the driven member by applying the fluid pressure created by reciprocating piston members to operate piston members operating with longitudinal thrust against a variably positioned "swash plate," the torque being governed by the angularity of the plate.

In the drawings, Figure 1 is a longitudinal mid-sectional view through the transmission mechanism.

Figure 1:
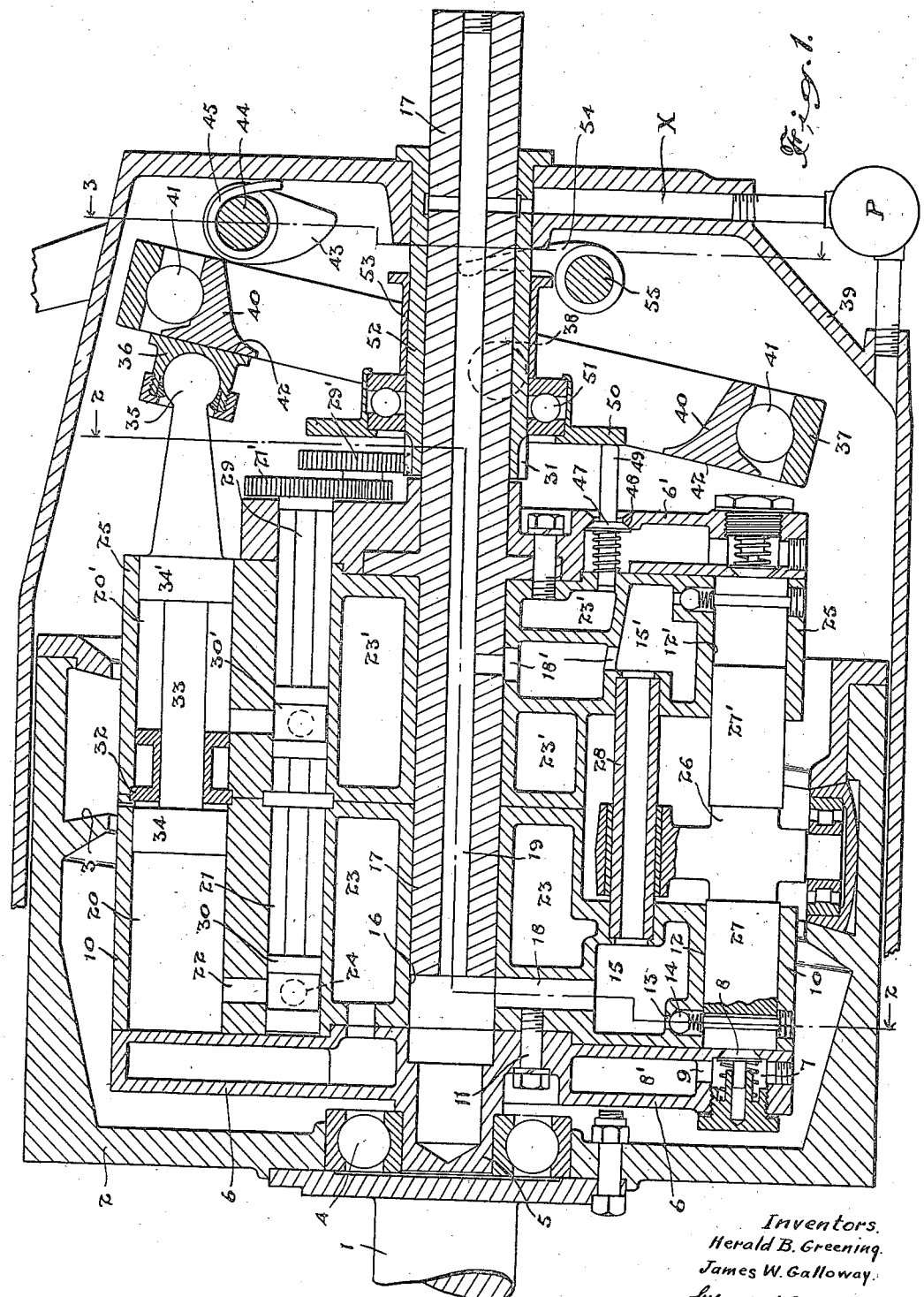

Referring to the accompanying drawings the driving shaft 1 has mounted thereon a drum-shaped fly wheel 2 which is formed with a cam groove 3 on its inner peripheral wall, said cam groove having a regular curvature adapted to effect longitudinal displacement of members engaging same.

A bearing 4 mounted axially within the fly wheel supports the stub shaft 5 of a hollow circular disc 6 and said disc is formed with a plurality of valve chambers 7 in each of which is arranged a spring loaded valve 8.

These valves prevent egress of fluid from the chambers 7 and the high pressure chamber 8' in the body of the disc which has communication with each of the chambers 7 through the holes 9.

A drum-shaped member 10 is rigidly secured to the inward face of the hollow disc 6 by the cap screws 11. This drum is formed with a plurality of cylinders 12 which are arranged each in axial alignment with one of the valves 7 and each cylinder is provided with an opening 13 close to the end of the drum abutting the hollow disc 6. A spring loaded ball valve 14 is seated in each of the openings 13 to close egress from the cylinders to the low pressure chamber 15 in the body of the drum but allowing the inflow of fluid from the chamber 15 to the cylinders.

The drum is formed with an axial bore 16 in which the inner end of the hollow driven shaft 17 is mounted.

A passage 18 connects the low pressure chamber 15 with the bore 16 and the passage 19 in the hollow shaft through which oil or other suitable fluid is fed from the duct X.

Between the spaced cylinders 12 in the drum 10 are arranged pairs of cylinders 20 and each pair of cylinders have communication with a longitudinal cylindrical valve chamber 21 through the passage 22.

A high pressure chamber 23 arranged in the body of the drum and separated from the low pressure chamber 15 is connected with each of the valve chambers 21 by a port 24.

A drum 25 of similar construction to the drum 10 is rigidly secured by the bolts B' to the drum 10 and the cylinders 12' are aligned with the cylinders 12 but the adjacent ends are spaced apart to permit the movement of the crossheads 26 which are provided with double pistons 27 and 27' operating respectively in the cylinders 12 and 12'. A hollow disc 6' similar to the disc 6 is arranged at the outer end of the drum 25 and it is provided with similar valves and passages.

Crosshead guides 28 are secured between the drums 10 and 25 to support the inner ends of the cross heads.

The drum 25 is provided with a low pressure chamber 15' which is connected with the bore 19 of the driven shaft 17 by a port 18' and it is also provided with a high pressure chamber 23' which is connected by passages corresponding with the passages 22 to the opposite end of the valve chamber 21 to which the passages 22 are connected.

A valve stem 29 extending axially of the valve chamber 21 has arranged thereon the valve members 30 and 30' controlling the flow of fluid from the high pressure chambers to the cylinders 20 and 20' which are arranged in axially aligned pairs on the drums 10 and 25 respectively. The valve stems 29 are rotated in pairs by idler gears 29' mounted on the drum and meshing with gears 21' on the valve stems and with the fixed central gear 31 to rotate and open and close the ports of the cylinders 20 and 20' at the proper periods as will be further explained.

Piston guides 32 are arranged between and separate the cylinders 20 and 20' and piston members 33 are arranged in these cylinders and are provided with piston heads 34 and 34' operating respectively in the cylinders 20 and 20'. The ends of the piston members 33 are formed with ball ends 35 on which are mounted the socket shoes 36.

A gimbal ring 37 is mounted on trunnions 38 (shown in dotted lines Fig. 1) which are journalled in the casing 39 enclosing the operating mechanism, and a "swash plate" ring 40 is carried on bearing 41 in the ring 37. The ring 40 is formed with a flat face 42 which forms a sliding bearing for the shoes 36.

It will be readily understood that if the "swash plate" is held at right angles to the shaft the piston members 33 will be held from longitudinal movement consequently the pistons 27 and 27' will be locked from longitudinal movement as the oil or motive fluid is held from escape and the contact of the piston crossheads with the fly wheel cam will cause the whole internal mechanism to revolve and the transmission of torque and speed will be at a ratio of 1 to 1.

If, however, the swash plate is tilted the piston members 33 will be free to move within the limitations of the angularity of the said swash plate thus allowing the drums to rotate in relation to the fly wheel. The cam 3 effects the longitudinal movement of the crossheads and the pistons force the motive fluid into the high pressure chambers from whence it is transmitted to the cylinders 20 and 20' to operate the piston members 33 thus imparting a driving torque through the drums to the driven shaft which is keyed thereto. This action occurs progressively in all the cylinders.

The speed of the driven shaft varies in accordance with the angularity of the swash plate. This plate is normally held in a position at right angles to the shaft by cams 43 mounted on a shaft 44 arranged transversely of the casing 39 and held by a torsion spring 45 encircling the shaft 44 and as the pressure in the high pressure chambers builds up by the resistance of the load on the driven shaft, the cam is forced to turn and the angularity of the swash plate is altered.

This action occurs automatically so that the required driving torque is transmitted to the driven shaft. The cam may be operated manually by the lever A secured to its shaft.

Figure 2:
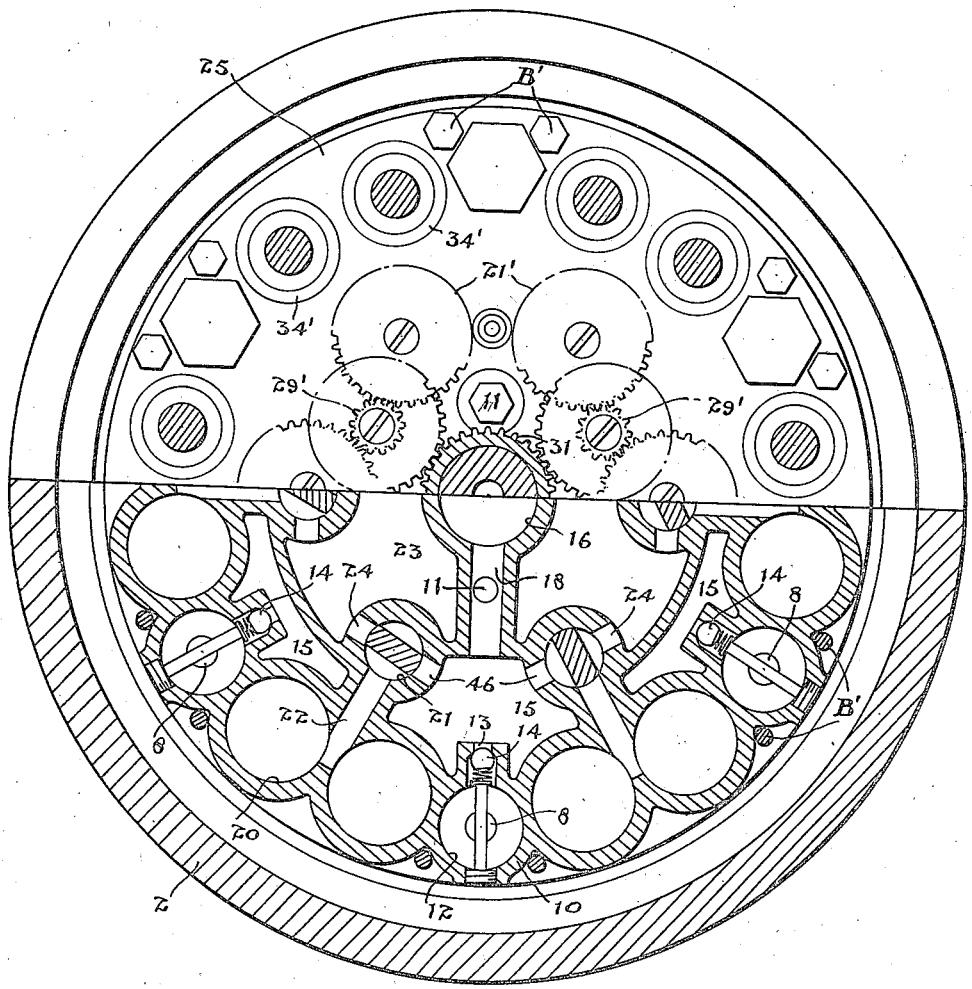
Figure 2 is a part end elevation and part cross section of the device taken on the line 2—2 of Figure 1.

It will be noted that the valve chambers 21 are provided with ports 46 (see Figure 2) connecting with the low pressure chambers so that as the valve stem 29 is rotated the oil is alternately admitted to the cylinders 20 and 20' from the high pressure chambers at the proper periods to drive the piston members 33 and discharged from the cylinders 20 and 20' to the low pressure chambers on the return movement of the pistons 34 and 34'.

Figure 3:
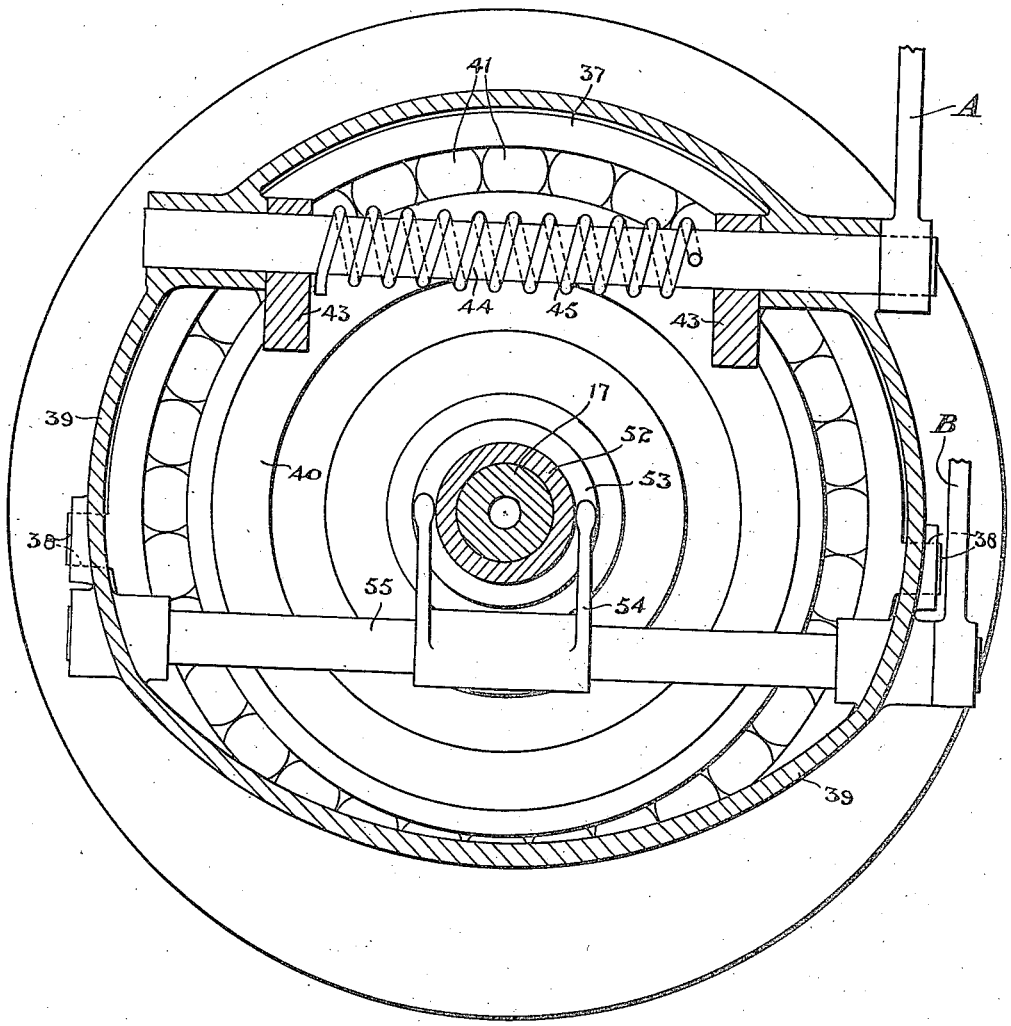
Figure 3 is a cross sectional view of the device taken through the line 3—3 of Figure 1.

The hollow disc 6' is provided with a spring loaded valve 47 closing an escape outlet 48 and an outwardly extending valve stem 49 engages a ring 50 mounted on a bearing 51 encircling the sleeve bearing 52 of the driven shaft. The ring 50 is moved longitudinally by a sleeve 53 which is operated by an arm 54 mounted on a shaft 55 extending transversely of the casing 39 and provided with a suitable operating lever B which is shown in Figure 3.

The valve 47 and its operating mechanism is provided so that the pressure in the high pressure chamber of the drum 25 may be released to allow the device to operate as a clutch.

The casing 39 will be closed and the oil discharged thereinto on the opening of the valve 47 will be circulated back to the low pressure chambers through the passage X and shaft bore 19 by means of a suitable low pressure pump P.

This provision enables the crossheads 26 to operate in the cylinders 12 and 12' freely in a full disengagement and the action of the clutch will be regulated by the manual regulation of the valve 47, the free movement of the pistons being retarded in proportion to the resistance of the oil to escape.

When the valve 47 is wide open the pistons 27 and 27' move freely and allow the fly wheel to rotate without turning the drums but as the escape of the oil is retarded the clutch will become effective to cause the drums to be driven with more or less slip.

What we claim as our invention is:

1. In a torque amplifier, the combination with a casing having a rotatable driving member and a rotatable driven member arranged therein, and means carried by said driven member and operatively engaging said driving member to create fluid pressure in said driven member, of means carried by said driven member and operated with a longitudinal movement by said fluid pressure, a swash plate pivotally mounted at diametrically opposite points in said casing and engaging said longitudinally movable means, an operating shaft rotatably mounted in said casing transversely of the axes of said rotatable members, a cam mounted on said operating shaft engaging said swash plate, and a torsion spring encircling said operating shaft and yieldingly holding said cam against the swash plate.

2. A torque amplifier, comprising, in combination, a fixed casing, driving and driven members arranged in said casing, said driven member having a plurality of paired oppositely disposed axially aligned cylinders spaced apart, piston members reciprocably mounted between said pairs of cylinders having piston portions extending into said cylinders, means carried by said driving member for reciprocating said piston members, a swash plate adjustably mounted in said casing, means opposing the fluid pressure set up in said paired cylinders and operatively engaging said swash plate, and resilient means for automatically adjusting said swash plate in opposition to the thrust imposed thereon by said opposing means.

3. A torque amplifier, comprising, in combination a fixed casing, driving and driven members arranged in said casing, said driven member having a plurality of paired oppositely disposed axially aligned cylinders spaced apart, piston members reciprocably mounted between said pairs of cylinders having piston portions extending into said cylinders, means carried by said driving member for reciprocating said piston members, a swash plate adjustably mounted in said casing, means opposing the fluid pressure set up in said paired cylinders and operatively engaging said swash plate, plurality of individual valves interposed between said paired cylinders and said fluid-pressure opposing means for controlling the passage of fluid pressure therebetween and means for operating said valves in timed sequence.

4. A torque amplifier, comprising, in combination a fixed casing, driving and driven members arranged in said casing, said driven member having a hollow interior, a partition dividing said hollow interior into separate chambers, means carried by said driven member and actuated by said driving member for setting up a fluid pressure in one of said chambers, a plurality of cylinders in said driven member arranged around the periphery, piston members reciprocably mounted in said cylinders and extending therebeyond, a plurality of valve chambers in said partition connected with said cylinders and with said chambers, valves operatively arranged in said valve chambers controlling the flow of fluid between said chambers and said cylinders, means for operating said valves in timed sequence, and a swash plate adjustably mounted in said casing and opposing the outward movement of said pistons.

5. A torque amplifier, comprising, in combination a fixed casing, driving and driven members arranged in said casing, said driven member having a hollow interior, a partition dividing said hollow interior into separate chambers, means carried by said driven member and actuated by said driving member for setting up a fluid pressure in one of said chambers, a plurality of cylinders in said driven member arranged around the periphery, piston members reciprocably mounted in said cylinders and extending therebeyond, a plurality of valve chambers in said partition connected with said cylinders and with said chambers, a spindle valve rotatably arranged in each of said valve chambers controlling the flow of fluid between said chambers and said cylinders, a gear wheel on the end of each valve spindle, pinions mounted on said driven member connecting said gears to operate in pairs, gear wheels fixed concentrically to said pinions, a fixed gear ring meshing with the latter gear wheels, and a swash plate adjustably mounted in said casing and opposing the outward movement of said pistons.

6. A torque amplifier, comprising a casing having rotatable driven and driving members therein, a plurality of opposed pairs of cylinders spaced around the periphery of said driven member, the cylinders of each pair being spaced axially apart and axially aligned, piston members reciprocably mounted between said opposed cylinders and carrying rigid piston extensions operably projecting thereinto, means carried by said driving member for reciprocating said piston members, a plurality of paired cylinders in said rotatable driven member interposed between the aforesaid cylinders, pistons in the latter cylinders extending therebeyond, a swash plate adjustably mounted in said casing and opposing the outward thrust of said latter pistons, a partition in said rotatable driven member dividing the interior into separate high and low pressure chambers, said high pressure chamber receiving the discharge from said first-mentioned opposed cylinders, a plurality of valves interposed between said high and low pressure chambers and the second mentioned cylinders and controlling the flow therebetween, and means for operating all of said valves in timed sequence.

7. In a torque amplifier, the combination with a casing having a rotatable driving member and a rotatable driven member arranged therein and means carried by said driven member and operatively engaging said driving member to create fluid pressure in said driven member, of means carried by said driven member and operated with a longitudinal movement by said fluid pressure, a swash plate adjustably mounted in said casing and engaging said longitudinally movable means, and resilient means engaging said swash plate adjacent the periphery thereof for automatically varying the angularity of said swash plate to effect a variation in the torque.

8. A torque amplifier, comprising a casing, a rotatable driving member, a rotatable driven member, means carried by said driven member and operatively engaging said driving member to create fluid pressure in said driven member, means carried by said driven member and operated with a longitudinal movement by said fluid pressure, a swash plate adjustably mounted in said casing and engaging said longitudinal movable means, spring operated means mounted in said casing operatively engaging said swash plate on one side adjacent the periphery thereof and resiliently opposing the thrust of the longitudinally pressure operated means and manual means for supplementing said latter means for effecting a positive movement of said swash plate.

9. In a torque amplifier, the combination with a casing having a rotatable driving member and a rotatable driven member arranged therein, and means carried by said driven member and operatively engaging said driving member to create fluid pressure in said driven member, of means carried by said driven member and operated with a longitudinal movement by said fluid pressure, a swash plate adjustably mounted in said casing and engaging said longitudinally movable means, a cam engaging said swash plate, and a spring resiliently holding said cam in operative engagement with said swash plate and resiliently opposing the thrust of said pressure operated means in proportion to the torque.

10. A torque amplifier, comprising in combination a rotatable driving member, a rotatable driven member having a plurality of axially opposed spaced cylinders, piston members interposed between said cylinders and having piston extensions projecting into the opposed cylinders, means carried by said driving member and operatively engaging said piston members to create fluid pressure in said driven member, cylinders arranged longitudinally of said driven member and spaced therearound, piston members operating in said latter cylinders and extending from one end thereof, high pressure chambers receiving the discharge from said opposed cylinders, low pressure chambers in said rotatable driven member, passages extending between each of said latter cylinders and said high and low pressure chambers, a plurality of valves controlling the passages of said latter cylinders, means operatively connecting said valves for operating said valves to open and close in progressive timed sequence, an enclosing casing, and an angularly disposed swash plate mounted in said casing and engaging and opposing the thrust of said second mentioned piston members.

11. A torque amplifier, comprising in combination a rotatable driving member, a rotatable driven member having high and low pressure fluid chambers therein, cylinders in said driven member in paired axially spaced relation, each cylinder having ports connected with said high and low pressure chambers, valves controlling said ports, piston members reciprocably interposed between the cylinders of each pair, pistons carried by each of said piston members and operating in said paired cylinders, said piston members operatively engaging the driving member and reciprocated thereby, cylindrical guides spaced parallelly from said pistons, said piston members having sleeve extensions encircling said guides to prevent rotation of said piston members and relieve lateral thrust thereon, cylinders arranged longitudinally in the driven member, pistons operating in and extending from one end of said latter cylinders, a fixed casing, a swash plate adjustably mounted in said casing and angularly disposed and opposing the outward thrust of said latter projecting pistons, and valving means directing fluid from said high pressure chamber into said latter cylinders and returning the fluid to the low pressure chamber therefrom.

12. A torque amplifier, comprising in combination a rotatable driving member, a rotatable driven member having high and low pressure fluid chambers therein, cylinders in said driven member arranged in paired relation, the cylinders of each pair being spaced apart and axially aligned and each having ports connected with said high and low pressure chambers, valves controlling said ports, piston members interposed one between each pair of cylinders and having axially aligned pistons operating in said paired cylinders, said piston members operatively engaging the driving member and reciprocated thereby, cylinders arranged longitudinally in said driven member, pistons operating in and extending from one end of said latter cylinders, an enclosing casing, a swash plate adjustably mounted in said casing and angularly disposed and opposing the outward thrust of said projecting pistons, a plurality of valve chambers each having ports connected with the high and low pressure chambers and with one of the latter cylinders, a rotary valve operating in each of said valve chambers and alternately directing high pressure fluid to the latter cylinders to move said pistons outwardly and return the fluid therefrom to the low pressure chamber, and means for operating said valves in timed sequence.

13. A torque amplifier, comprising in combination a rotatable driving member, a rotatable driven member journalled in the driving member, a plurality of drum-like sections spaced axially apart, a plurality of cylinders in each of said drum-like sections, the cylinders of one drum section being axially aligned with the cylinders of the other drum section, piston members interposed between said drum sections and having rigid piston extension projecting into the aligned cylinders of each section, means carried by the driving member for reciprocating said piston members to create fluid pressure, said rotatable driven member having a chamber for receiving and storing the fluid under pressure, a plurality of longitudinally arranged cylinders spaced around said drum sections, means for directing pressure fluid to the latter cylinders and discharging the fluid therefrom, pistons operating in the latter cylinders and extending from one end thereof, an enclosing casing, a swash plate rotatably mounted in said casing and angularly disposed to oppose the thrust of said extending pistons, and a shaft extending from the driven member.

14. In a torque amplifier, the combination with a casing having a rotatable driving member and a rotatable driven member arranged therein and means carried by said driven member and operatively engaging said driving member to create fluid pressure in said driven member, of means carried by said driven member and operated with a longitudinal movement by said fluid pressure, a swash plate adjustably mounted in said casing and engaging said longitudinally movable means, and spring actuated cam means operatively engaging said swash plate at one side adjacent the periphery thereof for automatically varying the angularity of said swash plate to effect a variation in the torque.

HERALD B. GREENING.
JAMES W. GALLOWAY.